US010481460B2

(12) United States Patent
Stephenson et al.

(10) Patent No.: US 10,481,460 B2
(45) Date of Patent: Nov. 19, 2019

(54) RESISTIVE COATING FOR VOLTAGE UNIFORMITY

(71) Applicant: Gentex Corporation, Zeeland, MI (US)

(72) Inventors: Michael T. Stephenson, Zeeland, MI (US); Sue F. Franz, Zeeland, MI (US); Henry A. Luten, Holland, MI (US); John S. Anderson, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/601,565

(22) Filed: May 22, 2017

(65) Prior Publication Data

US 2017/0336693 A1    Nov. 23, 2017

Related U.S. Application Data

(60) Provisional application No. 62/339,301, filed on May 20, 2016.

(51) Int. Cl.
*G02F 1/163* (2006.01)
*G02F 1/153* (2006.01)
(Continued)

(52) U.S. Cl.
CPC .............. *G02F 1/163* (2013.01); *E06B 9/24* (2013.01); *G02F 1/155* (2013.01); *G02F 1/1533* (2013.01); *G02F 1/161* (2013.01); *E06B 2009/2464* (2013.01); *G02F 1/153* (2013.01); *G02F 1/15165* (2019.01); *G02F 2001/1536* (2013.01)

(58) Field of Classification Search
CPC ........ G02F 1/00; G02F 1/0009; G02F 1/0018; G02F 1/01; G02F 1/0121; G02F 1/15; G02F 1/1521; G02F 1/1525; G02F 1/153; G02F 1/1533; G02F 1/155; G02F 1/161; G02F 1/163; G02F 2001/1502; G02F 2001/1515; G02F 2001/1536; G02F 2001/1552; G02F 1/15165; G09G 3/16; G09G 3/18; G09G 3/34; G09G 3/38; F21V 14/003;
(Continued)

(56) References Cited

U.S. PATENT DOCUMENTS 4,815,823 A * 3/1989 Kaneko ............ G02F 1/134336
349/147
4,832,463 A * 5/1989 Goldner ................ G02F 1/1525
359/270

(Continued)

FOREIGN PATENT DOCUMENTS

EP           2 947 508 A1    11/2015
WO    WO-2012/177790 A2    12/2012

OTHER PUBLICATIONS

International Search Report and Written Opinion for PCT/US2017/033837 dated Aug. 31, 2017 (8 pages).

*Primary Examiner* — William R Alexander
(74) *Attorney, Agent, or Firm* — Foley & Lardner LLP; Bradley D. Johnson (57) ABSTRACT

An electrode for an electrochromic device includes a resistive layer disposed over a conductive layer. The resistive layer is disposed between the conductive layer and an electrochromic material in the electrochromic device. The electrode reduces non-uniform response of the electrochromic material when the electrochromic device is in operation.

15 Claims, 11 Drawing Sheets

(51) Int. Cl.
  *G02F 1/155* (2006.01)
  *G02F 1/161* (2006.01)
  *E06B 9/24* (2006.01)
  *G02F 1/1516* (2019.01)

(58) Field of Classification Search
  CPC ......... B60R 1/088; C23C 14/48; C23C 14/58;
           C23C 14/5826; E06B 2009/2464; E06B
           9/24
  USPC .... 359/265, 267, 270, 273, 275; 345/55, 84,
           345/105, 204, 214, 690
  See application file for complete search history.

(56) References Cited

U.S. PATENT DOCUMENTS

| | | | | |
|---|---|---|---|---|
| 4,865,428 A * | 9/1989 | Corrigan | ................... | B60J 1/00 |
| | | | | 359/275 |
| 4,876,628 A * | 10/1989 | Goldner | ................ | G02F 1/1525 |
| | | | | 361/313 |
| 4,902,108 A | 2/1990 | Byker | | |
| 4,904,620 A | 2/1990 | Schmitz | | |
| 5,133,594 A * | 7/1992 | Haas | ...................... | G02F 1/1533 |
| | | | | 359/275 |
| 5,171,413 A * | 12/1992 | Arntz | ...................... | C23C 14/08 |
| | | | | 204/192.15 |
| 5,888,431 A | 3/1999 | Tonar et al. | | |
| 5,940,201 A | 8/1999 | Ash et al. | | |
| 6,057,956 A | 5/2000 | Ash et al. | | |
| 6,115,171 A * | 9/2000 | Minami | ................ | G02F 1/1533 |
| | | | | 359/237 |
| 6,137,620 A | 10/2000 | Guarr et al. | | |
| 6,249,369 B1 | 6/2001 | Theiste et al. | | |
| 6,268,950 B1 | 7/2001 | Ash et al. | | |
| 6,635,194 B2 | 10/2003 | Kloeppner et al. | | |
| 7,317,566 B2 * | 1/2008 | Tench | .................... | G02F 1/155 |
| | | | | 204/290.14 |
| 7,830,583 B2 * | 11/2010 | Neuman | ................ | B60R 1/088 |
| | | | | 359/265 |
| 8,284,471 B2 * | 10/2012 | Yeh | ....................... | G02F 1/1521 |
| | | | | 359/265 |
| 8,506,096 B2 * | 8/2013 | McCabe | ................ | B60R 1/088 |
| | | | | 359/604 |
| 8,727,547 B2 * | 5/2014 | McCabe | ................ | B60R 1/088 |
| | | | | 359/603 |
| 8,928,966 B1 | 1/2015 | Kloeppner et al. | | |
| 9,090,211 B2 * | 7/2015 | McCabe | ................ | B60R 1/088 |
| 9,091,868 B2 * | 7/2015 | Bergh | ................... | G02F 1/0121 |
| 9,341,912 B2 * | 5/2016 | Shrivastava | ........... | G02F 1/153 |
| 9,606,410 B2 * | 3/2017 | Bergh | ................... | G02F 1/0121 |
| 9,658,508 B1 * | 5/2017 | Bass | ....................... | G02F 1/163 |
| 2002/0015214 A1 | 2/2002 | Nishikitani et al. | | |
| 2007/0053046 A1 * | 3/2007 | Tench | .................... | G02F 1/155 |
| | | | | 359/237 |
| 2008/0151350 A1 | 6/2008 | Tonar et al. | | |
| 2012/0139824 A1 * | 6/2012 | Takahashi | ............... | G02F 1/155 |
| | | | | 345/105 |
| 2014/0043669 A1 | 2/2014 | Bergh et al. | | |
| 2014/0313562 A1 * | 10/2014 | Ruoff | ..................... | G02F 1/155 |
| | | | | 359/265 |
| 2016/0093824 A1 * | 3/2016 | Mcsporran | ............. | G02F 1/155 |
| | | | | 428/336 |
| 2016/0377946 A1 | 12/2016 | Baumann | | |
| 2017/0010512 A1 * | 1/2017 | Ruoff | ..................... | G02F 1/155 |
| 2017/0146880 A1 | 5/2017 | Baumann et al. | | |

* cited by examiner

RESISTIVE COATING FOR VOLTAGE UNIFORMITY

CROSS REFERENCE TO RELATED APPLICATIONS

This application claims the benefit of U.S. Provisional Patent Application No. 62/339,301, filed on May 20, 2016, the contents of each of which are incorporated herein by reference in their entirety for any and all purposes.

TECHNOLOGY

The present technology relates generally to the field of electrochromic devices.

BACKGROUND

The present technology relates generally to the field of electrochromic devices. The variability in color and light transmittance of electrochromic materials with applied voltage has allowed the production of mirrors with variable reflectance and windows with variable light transmission. It is desirable in electrochromic devices to maintain a uniform appearance, such as a substantially uniform color, light transmittance, or reflectance across the device. Variations in the voltage applied to the electrochromic material in an electrochromic device may produce variations in the response of the electrochromic material, and thereby produce variations in the appearance of the electrochromic device.

The susceptibility of electrochromic devices to undesirable voltage variations may be a function of the current load of the electrochromic material. For example, a current load of the electrochromic material may increase as the area of the electrochromic device increases, the cell spacing of the electrochromic device decreases, or the concentration of the electrochromic dyes increases. An increased current load of the electrochromic device may produce an undesired voltage drop across the electrochromic device. The voltage drop produces a non-uniform response of the electrochromic material and a non-uniform appearance of the electrochromic device. Efforts have been made to reduce the voltage drop across an electrochromic device by increasing the conductivity of the electrodes providing the voltage to the electrochromic material. However, as the current load of the electrochromic materials continues to increase the conductivity of the electrodes cannot be increased sufficiently to fully prevent undesired voltage variations.

SUMMARY

Embodiments provided herein relate generally to electrochromic devices. More specifically, the embodiments relate to an electrochromic device that includes a resistive coating to produce enhanced voltage uniformity.

An embodiment provides an electrode assembly for an electrochromic device. The electrode assembly includes a substrate, a conductive layer disposed over the substrate, and a resistive layer disposed over the conductive layer. The substrate, the conductive layer, and the resistive layer are substantially transparent. The electrode assembly may include an additional conductive layer disposed over the resistive layer, and the additional conductive layer may be substantially transparent. The conductive layer may include indium tin oxide. The resistive layer may include oxidized titanium disilicide. The resistive layer may have a resistance of about 1,000 to about 10,000 $\Omega$/square (or "$\Omega$/sq") between the underlying conductive layer and the EC material. The substrate may include a glass material or a polymer material.

Another embodiment provides an electrochromic device. The electrochromic device may include a first substrate, a first conductive layer disposed over the first substrate, a first resistive layer disposed over the first conductive layer, an electrochromic material, a second substrate, a second conductive layer disposed over the second substrate, and a second resistive layer disposed over the second conductive layer. The first resistive layer is disposed between the first conductive layer and the electrochromic material, and the second resistive layer is disposed between the second conductive layer and the electrochromic material. The electrochromic device may include at least one seal configured to prevent the electrochromic material from leaking out of the electrochromic device and/or being exposed to the atmosphere. The electrochromic device may include a first additional conductive layer disposed between the first resistive layer and the electrochromic material, and a second additional conductive layer disposed between the second resistive layer and the electrochromic material. The electrochromic device may have an electrochromic cell spacing of about 10 µm to about 750 µm. The first resistive layer may have a resistance of about 1,000 $\Omega$/square to about 10,000 $\Omega$/square, and the second resistive layer may have a resistance of about 1,000 $\Omega$/square to about 10,000 $\Omega$/square. The electrochromic device may be a window or mirror.

Another embodiment provides a method of producing an electrode for an electrochromic device. The method includes disposing a conductive layer over a substrate, and disposing a resistive layer over the conductive layer. The substrate, conductive layer, and the resistive layer are substantially transparent. The method may include disposing an additional conductive layer over the resistive layer, and the additional conductive layer may be substantially transparent. The method may include disposing a sacrificial material over a portion of the conductive layer before disposing the resistive layer over the conductive layer, and removing the sacrificial material after the deposition of the resistive layer. Removing the sacrificial material may include a laser ablation process. The sacrificial material may include chromium. Disposing the resistive layer may include a sputtering deposition process. Disposing the conductive layer may include a chemical vapor deposition or physical vapor deposition process.

BRIEF DESCRIPTION OF THE DRAWINGS

References are made to the accompanying drawings that form a part of this disclosure, and which illustrate the embodiments in which the systems and methods described in this Specification can be practiced. Like reference numbers represent like parts throughout the drawings.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The term "substantially transparent" as used herein will be understood by persons of ordinary skill in the art and will vary to some extent depending upon the context in which it is used. If there are uses of the term which are not clear to persons of ordinary skill in the art, given the context in which it is used, the term means that the material allows a light transmission of about 75% or more of a beam of light having a wavelength of 400 nm directed to the material at a specular angle of 10° through a thickness of 2 mm of the material.

Embodiments provided herein relate generally to electrochromic devices. More specifically, the embodiments relate to an electrochromic device that includes a resistive coating to produce enhanced voltage uniformity.

Electrochromic devices with high current loads may experience non-uniform appearance during operation due to undesired voltage variations across the device. For example, a high current load electrochromic device with an edge bus arrangement may experience a voltage drop across the area of the device that increases with distance from the edge bus. Such a voltage drop may result in an electrochromic device that is not capable of maintaining a uniform coloration across the device when activated, which is undesirable. An inability of an electrochromic device to color to the center of the device may be referred to as an irising effect.

The voltage drop across the device may be addressed by increasing the current available to the electrochromic material. However, the response of the electrochromic material may be self-limiting in terms of the amount of voltage that may be applied thereto. For this reason, previous efforts to increase the current available to the electrochromic material have attempted to increase the conductivity of the electrodes that supply the voltage to the electrochromic material. This approach allows the current available to the electrochromic material to be increased without increasing the drive voltage supplied to the electrodes. Current efforts to increase the conductivity of the electrodes have approached the limits of what is technically feasible with transparent electrode materials. Thus, other approaches to increasing the current available to the electrochromic material are desirable.

The present technology includes the inventors' discovery that by disposing a resistive layer between the electrodes that supply the voltage to the electrochromic material and the electrochromic material, the drive voltage supplied to the electrodes may be increased without increasing the voltage applied to the electrochromic material. This approach effectively increases the current available to satisfy the current load requirements of the electrochromic material while maintaining the voltage supplied to the electrochromic material in acceptable ranges. This solution is simple and cost effective, as current electrochromic materials designed for operation at low voltage may be employed. Additionally, the increased current delivery capacity of a system including such an arrangement allows for the production of electrochromic devices with increased area, decreased cell spacing, and increased electrochromic dye concentration.

Figure 1:
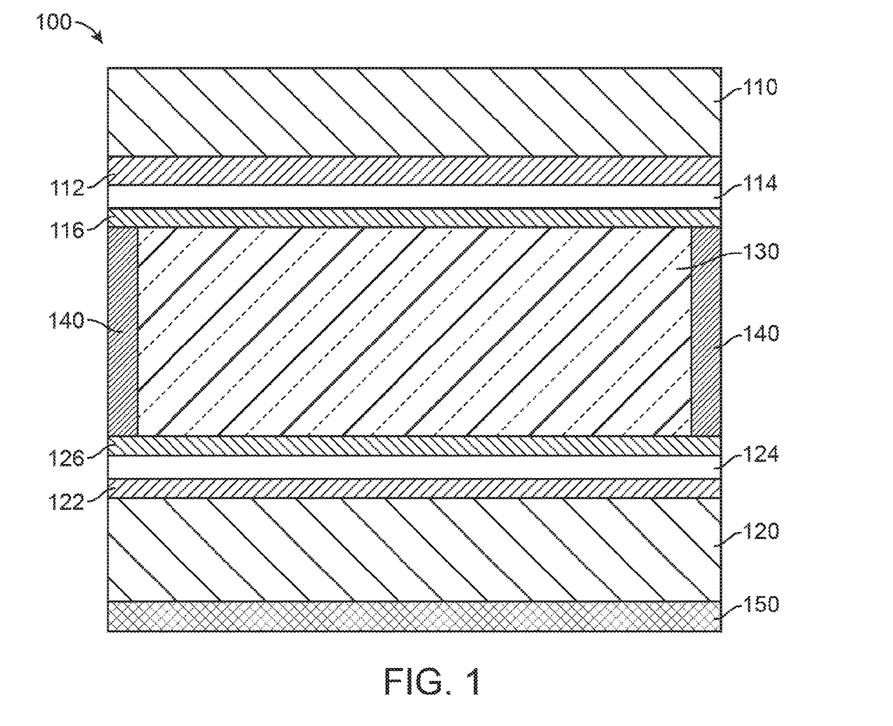
FIG. 1 is a cross-section of an electrochromic device, according one embodiment.

Referring to FIG. 1, a cross-section of an electrochromic device 100 according including a resistive layer of the type described above is depicted. The electrochromic device includes a first substrate 110 and a second substrate 120. A first conductive layer 112 is disposed over the first substrate 110, and a first resistive layer 114 is disposed between the first conductive layer 112 and an electrochromic material 130. Similarly, a second conductive layer 122 is disposed over the second substrate 120, and a second resistive layer 124 is disposed between the second conductive layer 122 and the electrochromic material 130. A voltage source (not shown) is electrically connected to the first conductive layer 112 and the second conductive layer 122 in a manner that applies a voltage across the electrochromic material 130. The application of a voltage across the electrochromic material 130 changes the coloration of the electrochromic material, thereby changing the appearance of the electrochromic device 100.

In some embodiments a first additional conductive layer 116 may be disposed between the first resistive layer 114 and the electrochromic material 130. Similarly, in some embodiments a second additional conductive layer 126 may be disposed between the second resistive layer 124 and the electrochromic material 130. The additional conductive layers serve to control for any variability across the resistive layer by dissipating any voltage irregularities that result from variability in the resistive layer over short length scales. The additional conductive layers are not directly electrically connected to the conductive layers. The first substrate 110, first conductive layer 112, first resistive layer 114, and additional conductive layer may be provided as a first panel. The second substrate 120, second conductive layer 122, first resistive layer 124, and second additional conductive layer 126 may be provided as a second panel. The first panel and the second panel may be joined by seals 140 to produce a cell in which the electrochromic material 130 is contained.

In some embodiments the electrochromic device 100 may be a mirror that includes a reflective layer 150 disposed over the second substrate 120. The reflective layer 150 may be disposed on a surface of the second substrate 120 opposite the surface of the second substrate 120 over which the second conductive layer 122 is disposed. Alternatively, the second conductive layer 122 or the second additional conductive layer 126 may be reflective.

In some embodiments the electrochromic device may be a window that does not include a reflective layer 150. In the case where the electrochromic device is a window, the first substrate 110, the first conductive layer 112, the first resistive layer 114, the first additional conductive layer 116, the second substrate 120, the second conductive layer 122, the second resistive layer 124, and the second additional conductive layer 126 are transparent or substantially transparent. As utilized herein "transparent" may refer to transparency to visible light and, optionally, near-IR light. Additionally, when the electrochromic device is a window the electrochromic material 130 is transparent or substantially transparent when the electrochromic device is in either the activated or non-activated state. As utilized herein the "activated state" of the electrochromic device is the state in which a voltage is applied to the electrochromic material 130.

The first substrate 110 and the second substrate 120, collectively referred to herein as the substrates, may be fabricated from any suitable material that is transparent or substantially transparent in the visible region of the electromagnetic spectrum, such as, for example, borosilicate glass, soda lime glass, natural and synthetic polymeric resins, plastics, and/or composites including polyesters (e.g. PET), polyimides (PI), polycarbonates, polysulfones, polyethylene naphthalate (PEN), ethylene vinyl acetate (EVA), acrylate polymers, as well as Topas®. In some embodiments the substrates may be a glass or plastic sheet. The type of material that forms the substrates may be selected based on the conditions of intended use, such as the use temperature, radiation exposure, and strength requirements. The physical dimensions of the substrates may also be selected such that the substrates exhibit the desired physical properties. Additionally, in some embodiments the substrates may include an ultraviolet absorbing material or layer to prevent ultraviolet radiation damage to the substrates, electrochromic material 130, or other elements of the electrochromic device 100. In embodiments where the electrochromic device is a mirror, the second substrate 120 may be fabricated from materials that are not transparent or substantially transparent, such as opaque and/or reflective metals, glasses, polymers, ceramics, or composite materials. In some embodiments, the first substrate 110 and the second substrate 120 may be fabricated from the same material, and may have the same thickness. In other embodiments the first substrate 110 may be formed from a different material and/or have a different thickness than the second substrate 120.

The first conductive layer 112, the first additional conductive layer 116, the second conductive layer 122, and the second additional conductive layer 126, collectively referred to herein as the conductive layers, may be any appropriate electrically conductive material, such as an electrically conductive material that is transparent or substantially transparent. Such conductive layers include, but are not limited to, those described in U.S. Patent Publication No. 2016/0266460, incorporated herein by reference in its entirety.

The conductive layers may be formed from transparent conductive oxides that are known in the art, such as indium tin oxide (ITO), tin oxide, fluorine doped tin oxide (FTO), zinc oxide, doped zinc oxide, indium zinc oxide, and the like. In some embodiments, the conductive layers include ITO. The conductive layer may be and/or include a conductive nanowire coating or conductive metal mesh material that has dimensions such that it does not substantially affect the reflection in the case of a mirror or the transparency in the case of a window. For example, the mesh or nanowire coating may have a transmission that is greater than 50%. In any of the above embodiments, the mesh may have a transmission that is greater than 60%, greater than 70%, greater than 80%, or greater than 90%. Illustrative nanowires coatings or conductive metal mesh materials include, but are not limited to silver, gold, stainless steel, aluminum, copper, nickel, molybdenum, tungsten, iridium, rhodium, ruthenium, platinum, cobalt, palladium, chromium, titanium, and alloys thereof. Nanowire based films can be formed via solution coated chemistry, printing processes, photographic technologies, rolling lithography, or self-assembly. Examples of films via solution coated chemistry include ClearOhm™ from Cambrios Technologies Corporation (10-300 Ω/□, >80% T) and Flexx™ from Carestream Advanced Materials (10-100 Ω/□, >80% T). These films are based on PET. A nanowire based film produced via self-assembly is Sante® from Cima NanoTech (10-100 Ω/sq, >80% T). Conductive metal mesh films are produced using a wide array of processing including printing, rolling lithography, and photographic technology. Exclucent™ film (<0.1 Ω/sq, 80% T) from Applied Nanotech is produced through a printing process. NanoWeb™ metal mesh (5Ω /sq, >80% T) from Rolith Inc. is produced through rolling lithography. Fujifilm offers a Exclear™ metal mesh (1-50 Ω/sq, >80% T) that is produced using a silver halide photographic process. The conductive material may also be and/or include an insulator/metal/insulator stack (an "IMI stack") such as those disclosed in U.S. Pat. Nos. 7,830,583 and 8,368,992. The insulator may be a transparent conductive oxide such as ITO and the metal may be a conductive metal such as silver. Such structures are able to obtain a sheet resistance of 5 to 9 Ω/sq while having a transmission higher than 80% and a thickness lower than 110 nm, which is much smaller than an ITO coating on plastic having 5 Ω/sq at 860 nm thickness. Further, the mesh, nanowire coating, and or IMI stack may have a sheet resistance of less than 1,000 Ω/sq. This may include a sheet resistance of less than 10 Ω/sq, less than 1 Ω/sq, less than 0.5 Ω/sq, less than 0.2 Ω/sq, less than 0.1 Ω/sq, less than 0.05 Ω/sq, or less than 0.01 Ω/sq. In any of the above embodiments, the mesh may have a sheet resistance of from about 0.0001 Ω/sq to about 50 Ω/sq. This may include meshes, nanowire coatings, and IMI stacks having a sheet resistance from about 0.0001 Ω/sq to about 10 Ω/sq, from about 0.0001 Ω/sq to about 5 Ω/sq, from about 0.0001 Ω/sq to about 1 Ω/sq, from about 0.001 Ω/sq to about 10 Ω/sq, and from about 0.001 Ω/sq to about 1 Ω/sq.

The conductive layers may, according to some embodiments, exhibit a sheet resistance from 0.1 to 1,000 Ω/square. This may include from 1 to 1,000 Ω/square, from 1 to 100 Ω/square, or from 1 to 50 Ω/square. The conductive layers may also be selected to ensure sufficient bonding strength with the first and second substrates, electrical conductance, and corrosion resistance. In embodiments where the electrochromic device is a mirror the second conductive layer 122 and/or the second additional conductive layer 126 may not be transparent or substantially transparent.

The first resistive layer 114 and the second resistive layer 124, collectively referred to herein as the resistive layers, may be any appropriate resistive material, such as a resistive material that is transparent or substantially transparent. The resistive layers may have a resistance of at least about 1,000 Ω/square and less than about 10,000 Ω/square, such as about 1,000 Ω/square to about 6,000 Ω/square. In some embodiments the resistive layers may have a resistance of about 3,000 Ω/square. In other embodiments, the resistive layer has a resistance from about 1,000 Ω/square to about 10,000 Ω/square. In various other embodiments, the resistive layer has a resistance from about 1000 Ω/square to about 6,000 Ω/square, or from about 2,000 Ω/square to about 4,000 Ω/square. The resistive layers may be selected such that the driven voltage is reduced to apply a maximum voltage above the minimum coloring potential and below the damage potential of to the electrochromic material. In some embodiments the resistive layers may include oxidized titanium disilicide, undoped tin oxide, ceramics, polymers, and polymer/nanoparticle composites. The resistive layers may be formed from materials that produce a sufficient bonding strength with the conductive layers, and the thickness of the resistive layers may be selected to render the resistive layers transparent or substantially transparent.

The electrochromic material 130 may be any appropriate electrochromic material, such as a single-layer, single-phase electrochromic materials, multi-layer electrochromic materials, or multi-phase electrochromic materials. Illustrative electrochromic materials include those described in U.S. Pat. Nos. 4,902,108; 5,888,431; 5,940,201; 6,057,956; 6,268,950; 6,635,194; and 8,928,966, U.S. Patent Publication Nos. 2002/0015214, 2016/0377946, and U.S. patent application Ser. No. 15/065,808, each of which is incorporated herein by reference in its entirety. Anodic and cathodic electrochromic materials may also include coupled materials as described in U.S. Pat. No. 6,249,369. The concentration of the electrochromic materials may be selected as taught in U.S. Pat. No. 6,137,620. The electrochromic material may exhibit a change in its extinction coefficient at one or more wavelengths upon exposure to a particular voltage, this behavior may be observed as a change in coloration or transmittance of the electrochromic material. In some embodiments the electrochromic material may produce a change in the appearance of the electrochromic device in response to an applied voltage.

The seals 140 may be any appropriate seal material, such as resin material. The seal material may be selected to produce a sufficient bonding strength with the conductive layers. The seals 140 are configured to maintain the electrochromic material in the cell space of the electrochromic device, and may be formed of a material that is insoluble or substantially insoluble in the electrochromic material 130. The seals 140 may be formed from an epoxy material, a urethane material, a cyanoacrylate material, an acrylic material, a polyimide material, a polyamide material, a polysulfide material, a phenoxy resin, a polyolefin material, a silicone material, or combinations of any two or more thereof.

In some embodiments the electrochromic device may include a sensing electrode. The sensing electrode may be configured to measure the voltage applied at the electrochromic material. A control circuit or device may utilize the measured voltage to adjust the drive voltage supplied by the voltage source to maintain voltage applied to the electrochromic material in a desired range, such as about 1.2 V. The drive voltage necessary to produce the desired voltage at the electrochromic material may depend on environmental factors, such as temperature. For this reason, a sense electrode may be especially beneficial in applications where an electrochemical device may be subjected to a variety of environmental conditions.

The electrodes for the electrochromic device may be formed by any appropriate process. In some embodiments the electrodes may be formed by disposing a conductive layer over a substrate. The conductive layer may be formed by any appropriate deposition process, such as a chemical vapor deposition (CVD) process or a physical vapor deposition process (PVD). In some embodiments the conductive layer may be formed by a sputtering deposition process.

The resistive layer may then be disposed over the conductive layer by any appropriate deposition process. In some embodiments the resistive layer may be formed by a CVD or PVD process, such as a sputtering deposition process.

The additional conductive layer may then be disposed over the resistive layer by any appropriate deposition process. In some embodiments the resistive layer may be formed by a CVD or PVD process, such as a sputtering deposition process. The additional conductive layer may be disposed utilizing the same deposition process as the conductive layer.

Figure 2:
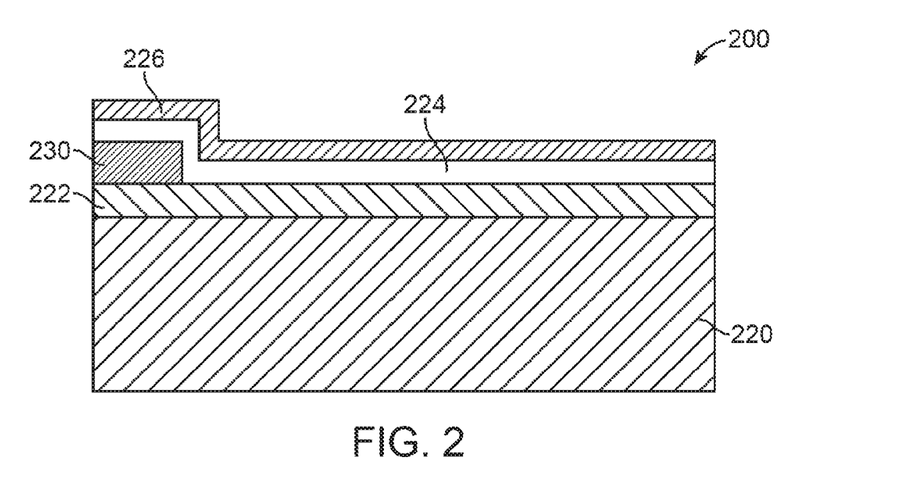
FIG. 2 is a cross-section of an electrode precursor including a sacrificial portion, according to one embodiment.
Figure 3:
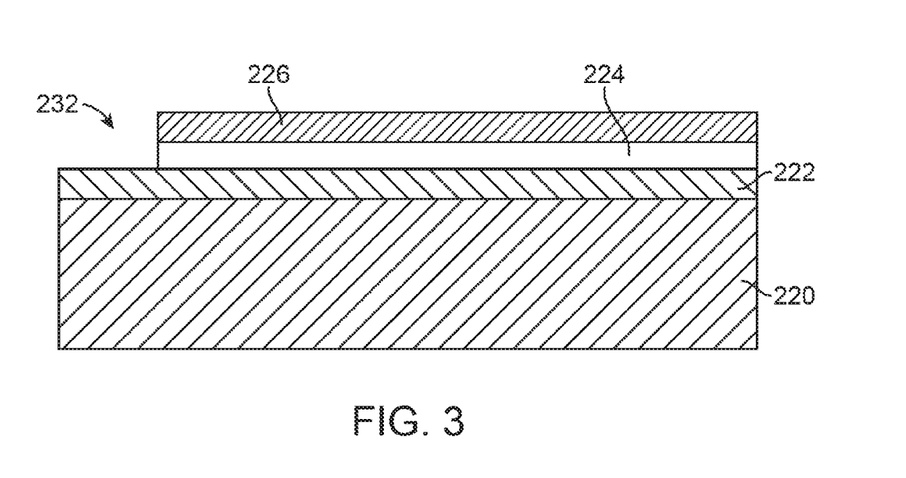
FIG. 3 is a cross-section of the electrode precursor of FIG. 3 after removal of the sacrificial portion, according to one embodiment.

In some embodiments, a sacrificial material may be disposed over a portion of the conductive layer prior to the deposition of the resistive layer. The sacrificial material may be any appropriate material that may be removed from the conductive layer after the completion of the deposition of the resistive layer and the additional conductive layer, such as a material that includes chromium. FIG. 2 depicts an electrode 200 including a sacrificial material 230 that is disposed over a portion of a conductive layer 222 and beneath a resistive layer 224 and an additional conductive layer 226. The electrode 200 includes a substrate 220 over which the conductive layer is disposed. As shown in FIG. 3, the removal of the sacrificial material provides access 232 to the conductive layer 222 by removing the portions of the resistive layer and the additional conductive layer that are disposed on the sacrificial material. The removal of the sacrificial material allows a voltage source to be conveniently connected to the conductive layer. The sacrificial material may be removed by any appropriate process that will not damage the conductive layer or substrate. In some embodiments the sacrificial material may be removed by a laser ablation process.

The electrodes conductive layers may then be assembled to form the electrochromic device. The electrodes may be assembled to form an electrochromic cell that will be filled with electrochromic material. The electrochromic cell spacing may be determined by the distance between the electrodes. The cell spacing may be in the range of about 10 µm to about 750 µm, such as about 20 µm to about 600 µm. In some embodiments the cell spacing may be about 135 µm. In some embodiments spacers may be disposed between the electrodes to maintain the desired cell spacing, such as glass or polymer beads. The open edges of the electrochromic cell are closed with seals. The seals may also serve to bond the electrode assemblies together.

The electrochromic cell is then filled with the electrochromic material. The opening through which the electrochromic material is provided to the electrochromic cell may then be closed by a plug or seal. The closed electrochromic cell prevents the electrochromic material from leaking out of the electrochromic device and/or being exposed to the atmosphere.

The production of an electrochromic device may also include the establishment of electrical connections to the electrodes from a voltage source and control circuitry. The electrical connections may be established through any appropriate means, such as wiring and solder connections of the type known in the art. The voltage source may be any appropriate voltage source, and may be a direct current voltage source. In some embodiments, the voltage source may be any appropriate voltage source, and may be a direct current voltage source operating at less than or up to about 12 V. The control circuitry may be capable of altering the voltage supplied to the electrochromic device, such as a computer control circuit.

Figure 4:
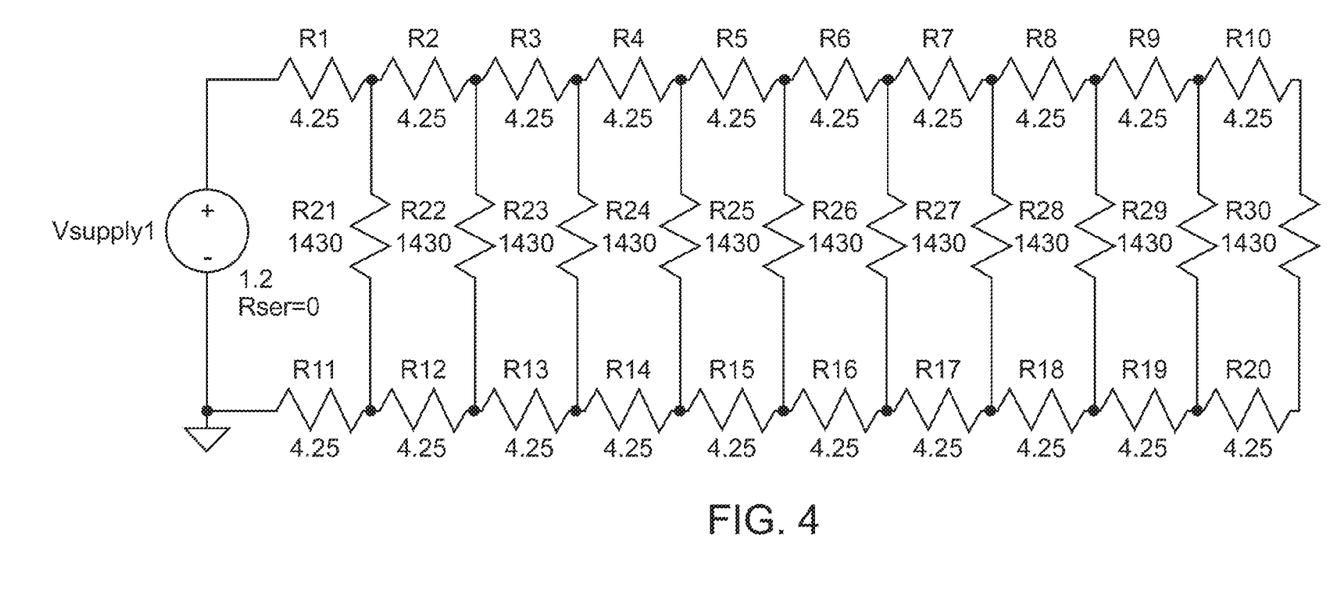
FIG. 4 is a schematic representation of an electrochromic device that does not include resistive layers in the electrodes, according to one embodiment.

To confirm the effect of the resistive layers, an electrochromic device was simulated in LT SPICE software. The modeled electrochromic devices were 1 cm by 10 cm, and powered from a single side. The electrochromic device was modeled with a sheet resistance of 4.25 Ω/square, and the electrochromic material has a resistance of 1,430 Ω/square (a steady state current of 0.00083 mA at 1.2 V). An electrochromic device without a resistive layer of the type described above is depicted in FIG. 4, this simulation was employed to establish baseline performance of an electrochromic device. The simulation is based on a cell spacing of 137 µm. In the simulation shown in FIG. 4 elements R1-R10 correspond to a first conductive layer, elements R21-R30 correspond to the electrochromic material, and elements R11-R20 correspond to a second conductive layer. A DC sweep simulation on the circuit shown in FIG. 4 with a driven voltage from the power supply of 1.2 V produced a measured voltage across node R1-R21 of 1.17 V and across node R10-R30 of 1.045 V. Thus, the electrochromic device that does not include a resistive layer exhibited a voltage drop across the device of 125 mV.

Figure 5:
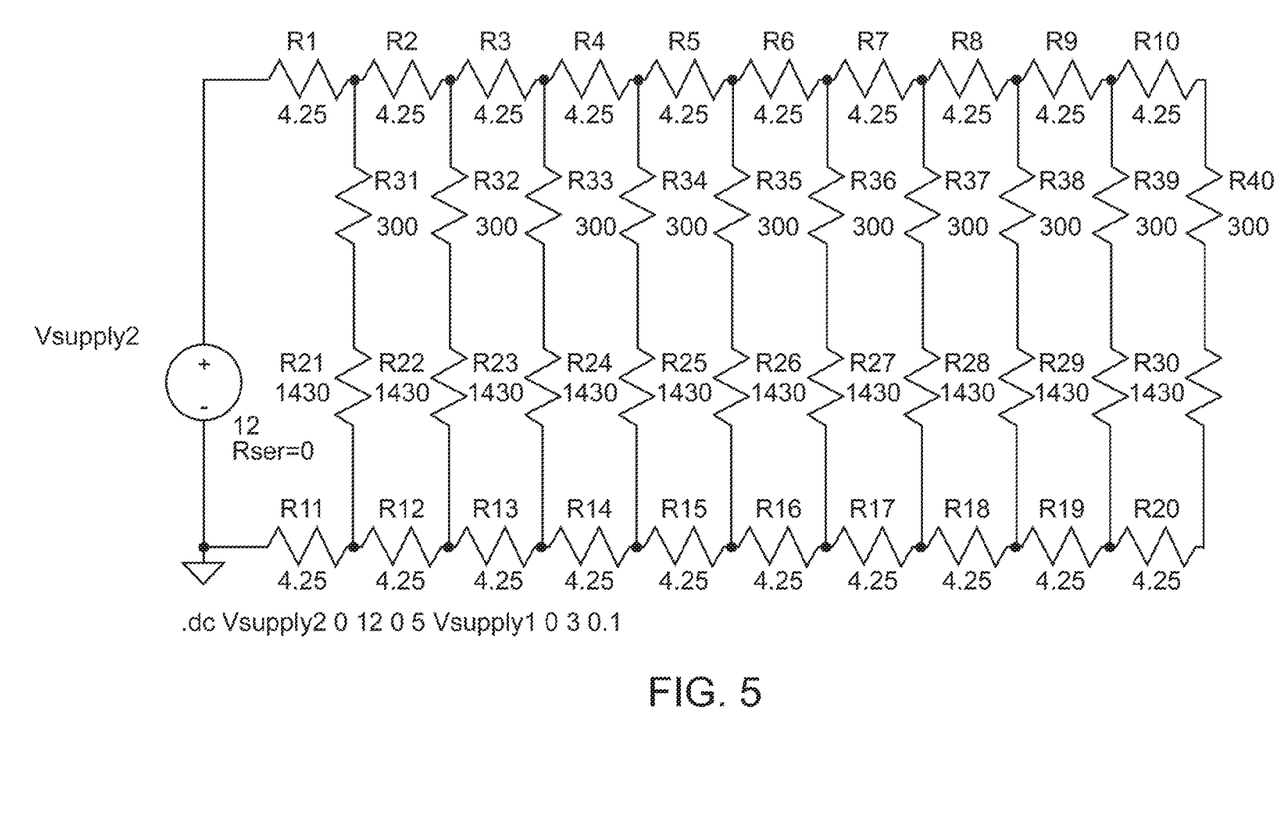
FIG. 5 is a schematic representation of an electrochromic device that includes a resistive layer in an electrode, according to one embodiment.

FIG. 5 depicts an electrochromic device simulation with a resistive layer corresponding to elements R31-R40 disposed between elements R1-R10 which correspond to a first conductive layer and elements R21-R30 which correspond to the electrochromic material. The resistive layer elements R31-R40 are modeled by 300Ω resistors. A DC sweep simulation on the circuit shown in FIG. 5 with a driven voltage from the power supply that produces a measured voltage across node R31-R21 of 1.2 V results in a measured voltage across node R40-R30 of 1.103 V. Thus, the electrochromic device including the resistive layer shown in FIG. 5 exhibited a voltage drop across the device of 97 mV.

Figure 6:
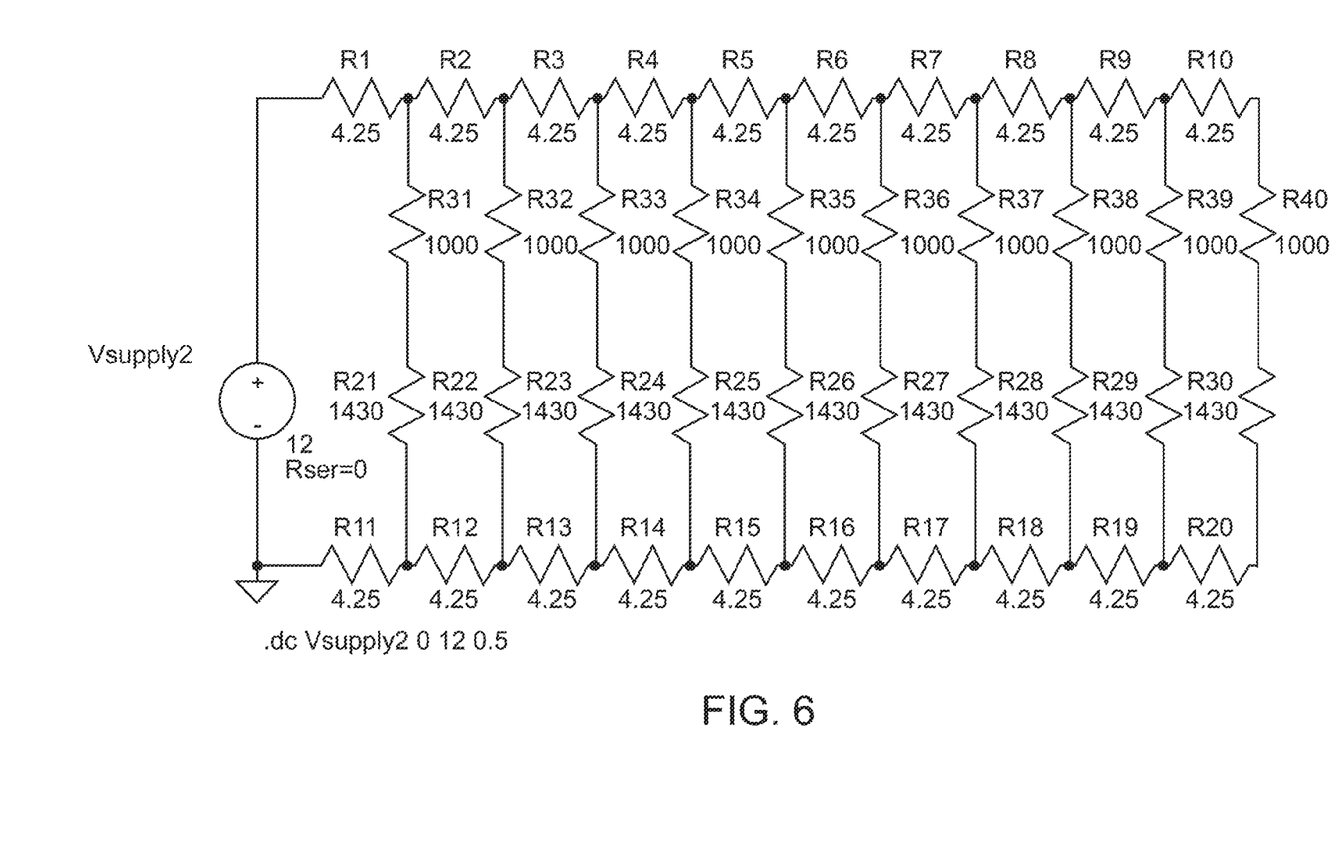
FIG. 6 is a schematic representation of an electrochromic device that includes a resistive layer in an electrode, according to one embodiment.

FIG. 6 depicts an electrochromic device simulation similar to the device shown in FIG. 5, except that the resistive layer elements R31-R40 are modeled by 1,000 Ω resistors. A DC sweep simulation on the circuit shown in FIG. 6 with a driven voltage from the power supply that produces a measured voltage across node R31-R21 of 1.2 V results in a measured voltage across node R40-R30 of 1.175 V. Thus, the electrochromic device including the resistive layer shown in FIG. 6 exhibited a voltage drop across the device of 25 mV.

Figure 7:
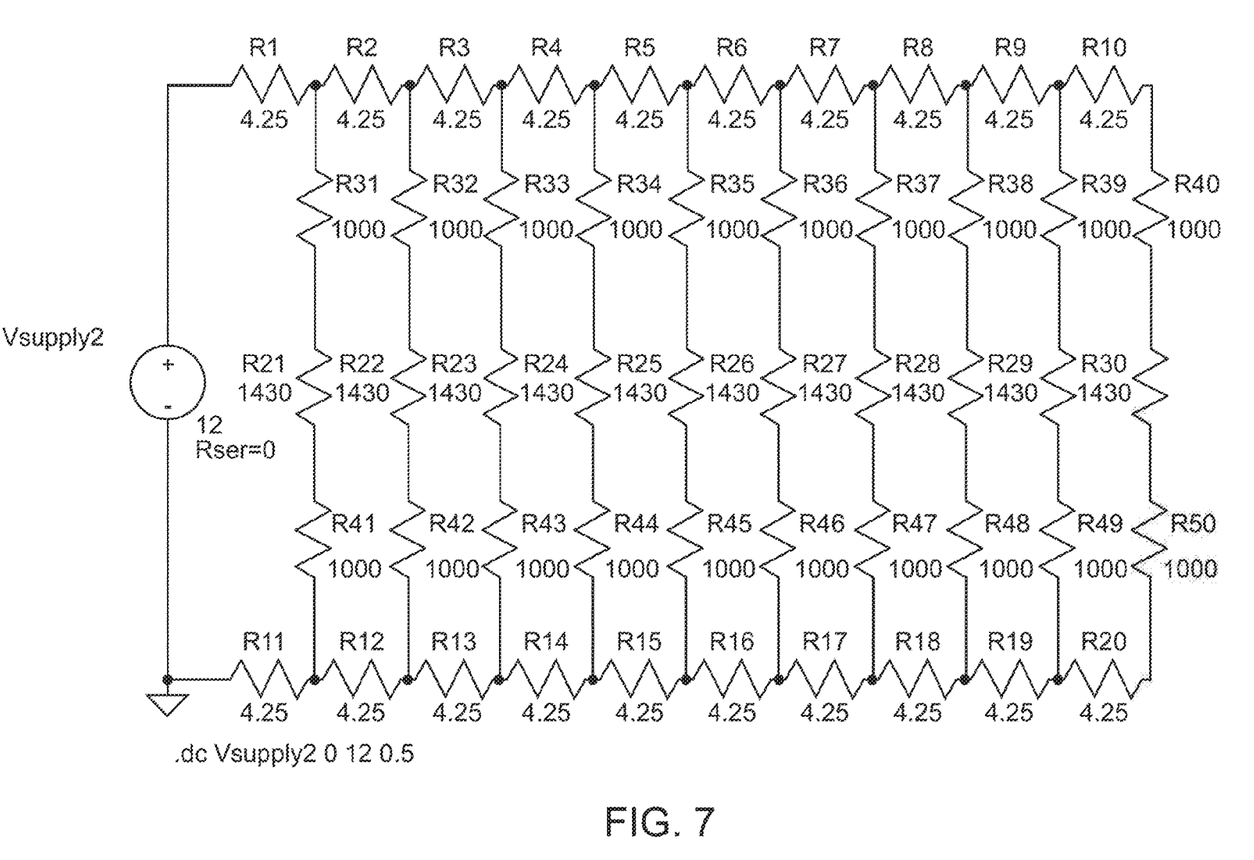
FIG. 7 is a schematic representation of an electrochromic device that includes a resistive layer in both electrodes, according to one embodiment.

FIG. 7 depicts an electrochromic device simulation similar to the device shown in FIG. 6, with a second resistive layer provided between the electrochromic material and the second conductive layer. The second resistive layer corresponds to elements R41-R50, and is modeled by 1,000 Ω resistors. A DC sweep simulation on the circuit shown in FIG. 7 with a driven voltage from the power supply that produces a measured voltage across the electrochromic material at the node closest to the powered edge of 1.2 V results in a measured voltage across the electrochromic material at the node furthest away from the powered edge of 1.08 V. The drive voltage was 2.95 V. Thus, the electrochromic device shown in FIG. 7 exhibited a voltage drop across the device of 120 mV. An electrochromic device was also simulated with the resistive layers modeled by 3,000 Ω resistors.

A DC sweep simulation on the circuit shown in FIG. 7 with a driven voltage of 1.2 V that produces a measured voltage across the electrochromic material at the node closest to the powered edge of 1.142 V and a measured voltage across the electrochromic material at the node furthest away from the powered edge of 0.892 V. Thus, the electrochromic device shown in FIG. 7 exhibited a voltage drop across the device of 0.25 V when a drive voltage of 1.2 V was employed.

Figure 8:
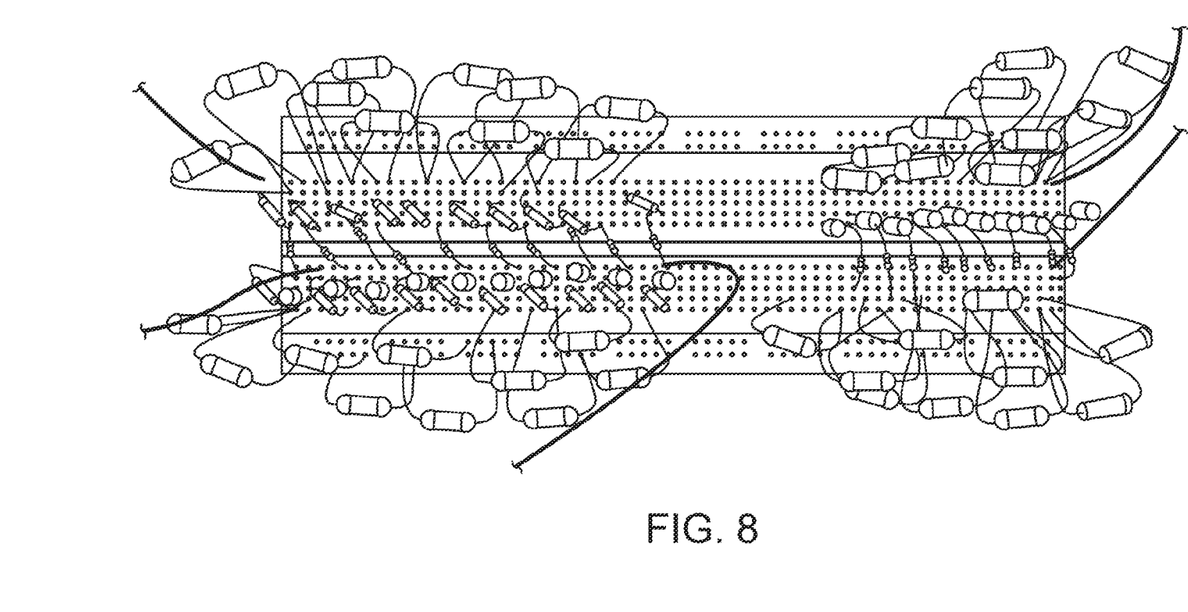
FIG. 8 is an illustration based upon a photograph of a laboratory simulation of an electrochromic device with a 3,000 Ω resistive layer in each electrode on the left and an electrochromic device without a resistive layer on the right, according to one embodiment.
Figure 9:
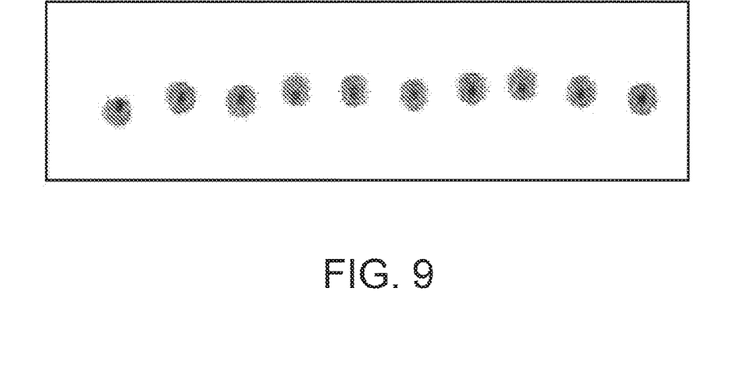
FIG. 9 is a photograph of the simulation of an electrochromic device with a 3,000 Ω resistive layer in each electrode of FIG. 8 powered with a voltage of 12V, with the powered edge being on the left, according to one embodiment.
Figure 10:
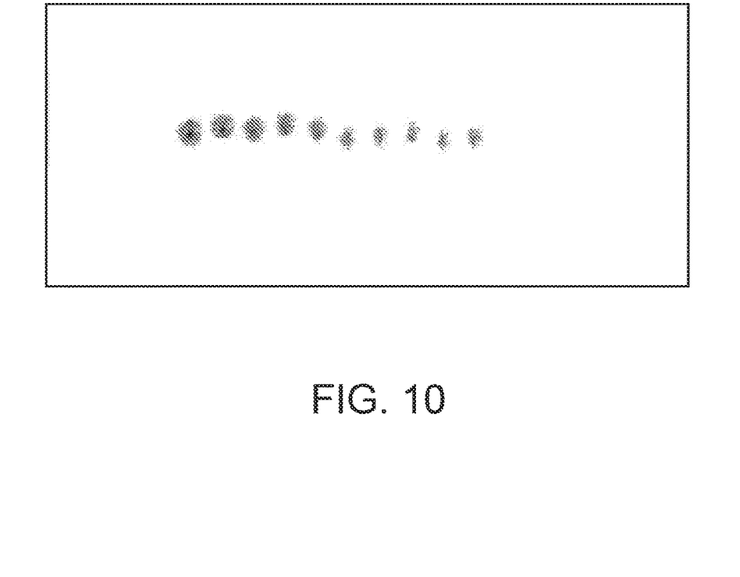
FIG. 10 is a photograph of the simulation of an electrochromic device without a resistive layer in each electrode of FIG. 8 powered with a voltage of 2.2 V, with the powered edge being on the left, according to one embodiment, according to one embodiment.

To confirm the behavior predicted by the software simulations, a laboratory simulation of an electrochromic device was produced. As shown in FIG. 8 an electrochromic device with a 3,000 Ω resistive layer in each electrode was produced, shown on the left, and an electrochromic device without a resistive layer was produced as a control, on the right. Light emitting diodes (LED) were used to simulate the electrochromic material, as LED elements have some similarities to electrochromic materials and allow for a visual demonstration of the effect. FIG. 9 shows the illumination response of the device with the 3,000 Ω resistive layer with a drive voltage of 12 V. The light intensity produced by the LED elements shown in FIG. 9 is substantially uniform across the device. FIG. 10 shows the illumination response of the device without resistive layers with a drive voltage of 2.2 V. The light intensity produced by the LED elements showed a significant decrease as distance from the powered edge of the device increases. The images in FIGS. 9 and 10 were produced with a filter that minimizes glare.

Figure 11:
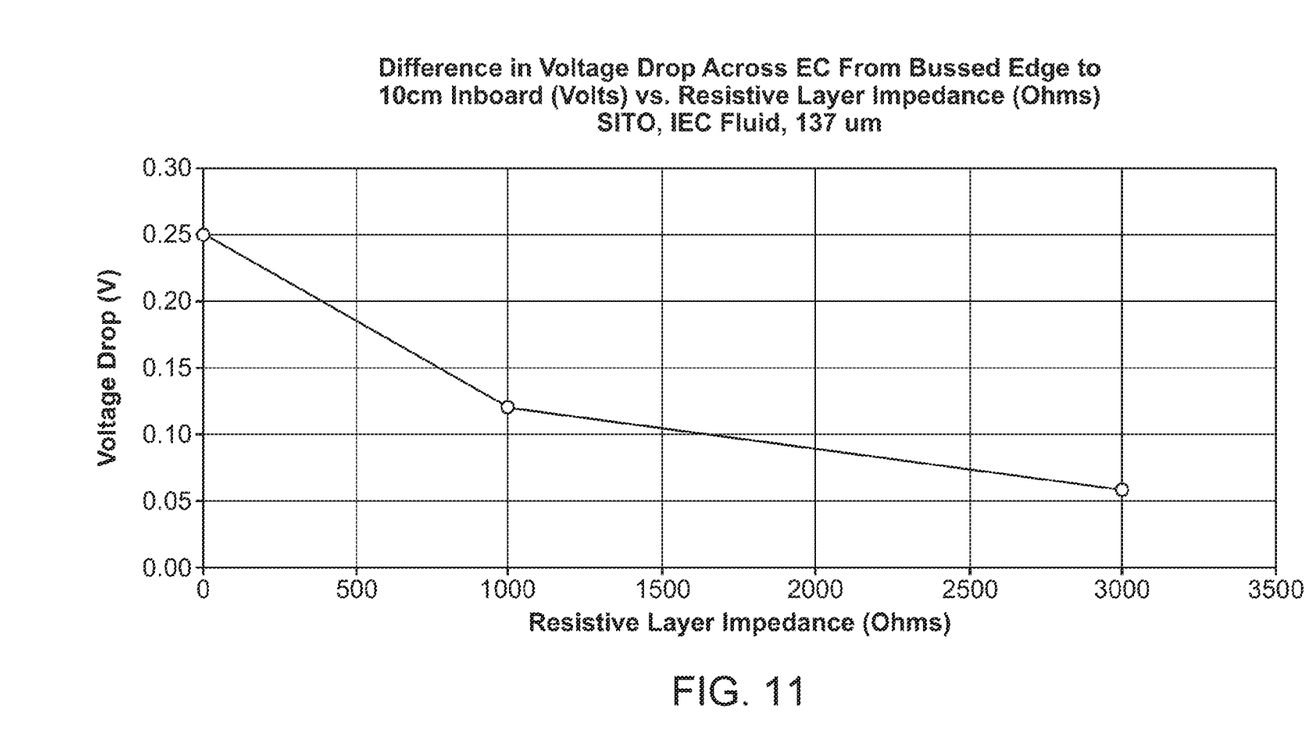
FIG. 11 is a graph of voltage drop across an electrochromic material at a distance of 10 cm from a powered edge as a function of resistive layer impedance, according to one embodiment.
Figure 12:
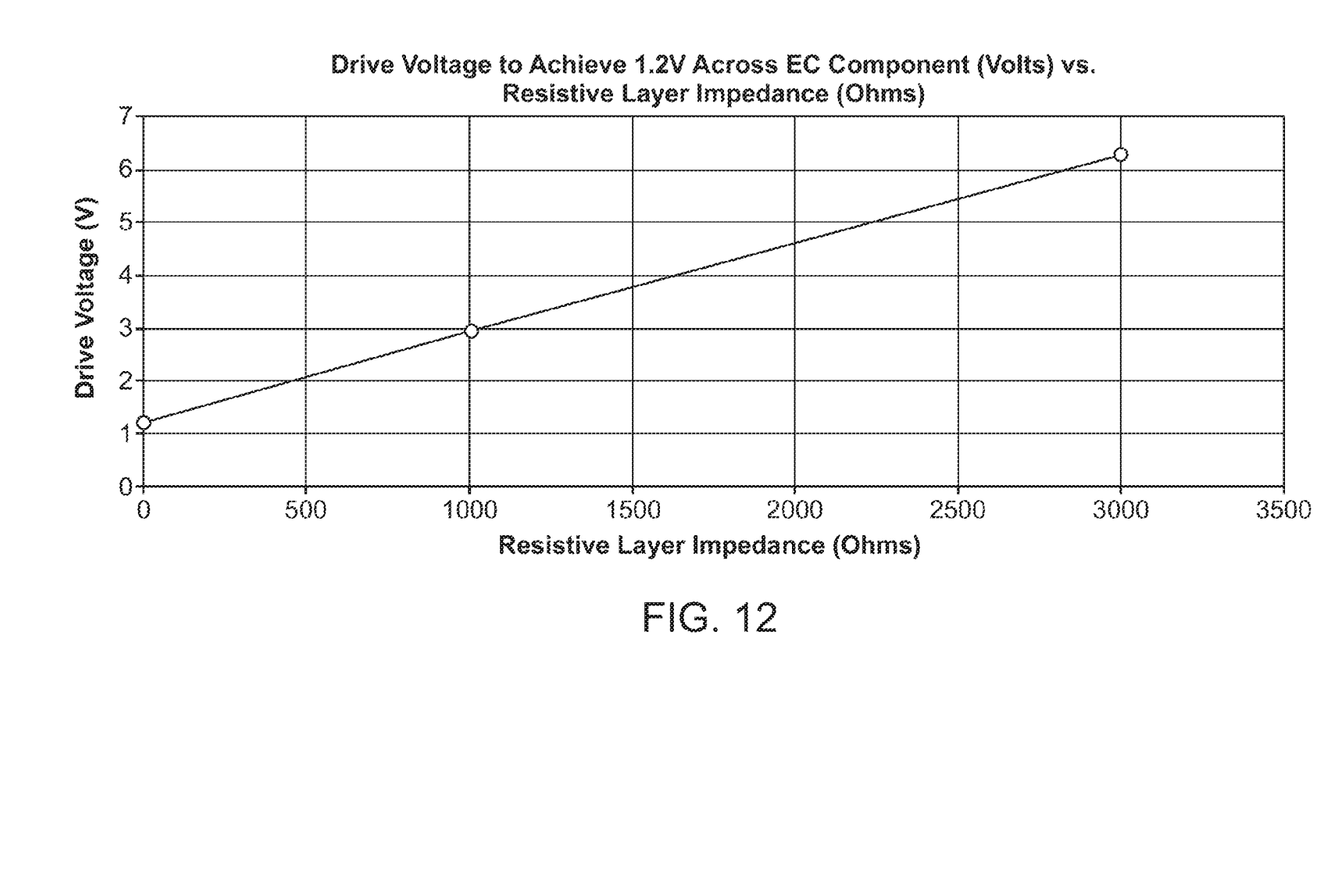
FIG. 12 is a graph of drive voltage supplied to an electrode to achieve a voltage of 1.2 V across an electrochromic material as a function of resistive layer impedance, according to one embodiment.

The simulated electrochromic devices produced information on the behavior trends of such devices. FIG. 11 depicts the voltage drop across an electrochromic material from a powered (bussed) edge to a point 10 cm from the powered edge as a function of resistive layer impedance. As shown in FIG. 11, the voltage drop decreases with increasing resistive layer impedance. FIG. 12 depicts the drive voltage necessary to achieve a voltage of 1.2 V across an electrochromic component at a powered edge of an electrochromic device as a function of resistive layer impedance. As shown in FIG.

12, the drive voltage increases with increasing resistive layer impedance. The graphs shown in FIGS. 11 and 12 were produced utilizing LT SPICE simulations of the type described above.

Figure 13:
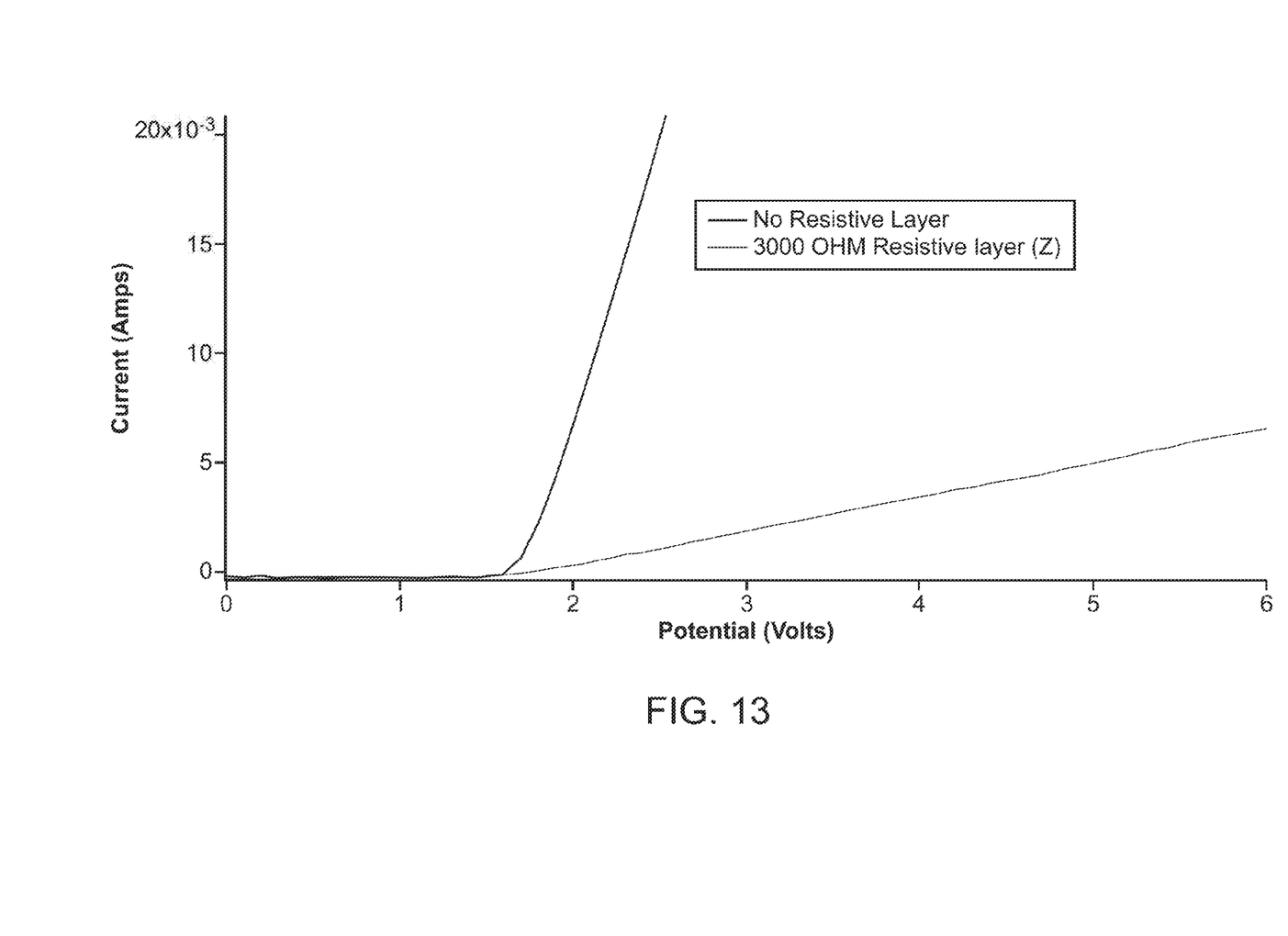
FIG. 13 is a graph of current as a function of potential for the laboratory simulations of the electrochromic devices of FIG. 8.

FIG. 13 depicts the current supplied to an electrochromic material as a function of the potential across the electrochromic material. The data reported in FIG. 13 was produced using the laboratory simulations including LED elements described above. As shown in FIG. 13, the device that includes 3,000 Ω resistors modeling resistive layers induces a "bending" of the curve associated with the device. The inclusion of the resistive layer increases the voltage necessary to produce a given current, above a voltage of about 1.5 V.

The principles described above with regard to the inclusion of an electrochromic device that includes resistive layers may be applied to any electrochromic device. For example, the electrochromic device may be a window, mirror or display.

The terminology used herein is intended to describe particular embodiments and is not intended to be limiting. The terms "comprises" and/or "comprising," when used herein, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used herein may, but does not necessarily, refer to the same embodiment. The embodiments described herein are exemplary only. Other and further embodiments may be devised without departing from the basic scope thereof.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such claims:

A. An electrode assembly for an electrochromic device, comprising:
  a substrate;
  a conductive layer disposed over the substrate; and
  a resistive layer disposed over the conductive layer,
  wherein the substrate, the conductive layer, and the resistive layer is substantially transparent.

B. The electrode assembly of Paragraph A, further comprising an additional conductive layer disposed over the resistive layer, wherein the additional conductive layer is substantially transparent.

C. The electrode assembly of Paragraph A or Paragraph B, wherein the conductive layer disposed over the substrate comprises indium tin oxide.

D. The electrode assembly of any one of Paragraphs A-C, wherein the resistive layer comprises oxidized titanium disilicide.

E. The electrode assembly of any one of Paragraphs A-D, wherein the resistive layer has a resistance of about 1,000 Ω/square to about 10,000 Ω/square.

F. The electrode assembly of any one of Paragraphs A-E, wherein the substrate comprises a glass material or a polymer material.

G. An electrochromic device, comprising:
  a first substrate;
  a first conductive layer disposed over the first substrate;
  a first resistive layer disposed over the first conductive layer;
  an electrochromic material;
  a second substrate;
  a second conductive layer disposed over the second substrate; and
  a second resistive layer disposed over the second conductive layer,
  wherein the first resistive layer is disposed between the first conductive layer and the electrochromic material, and the second resistive layer is disposed between the second conductive layer and the electrochromic material.

H. The electrochromic device of Paragraph G, further comprising at least one seal configured to prevent the electrochromic material from leaking out of the electrochromic device and/or configured to prevent atmospheric exposure of the electrochromic material.

I. The electrochromic device of Paragraph G or Paragraph H, wherein the first conductive layer comprises indium tin oxide.

J. The electrochromic device of any one of Paragraphs G-I, wherein the second conductive layer comprises indium tin oxide.

K. The electrochromic device of any one of Paragraphs G-J, wherein the first resistive layer comprises oxidized titanium disilicide.

L. The electrochromic device of any one of Paragraphs G-K, wherein the second resistive layer comprises oxidized titanium disilicide.

M. The electrochromic device of any one of Paragraphs G-L, further comprising a first additional conductive layer disposed between the first resistive layer and the electrochromic material, and a second additional conductive layer disposed between the second resistive layer and the electrochromic material.

N. The electrochromic device of Paragraph M, wherein the first additional conductive layer comprises indium tin oxide.

O. The electrochromic device of Paragraph M or Paragraph N, wherein the second additional conductive layer comprises indium tin oxide.

P. The electrochromic device of any one of Paragraphs G-O, wherein the electrochromic device has an electrochromic cell spacing of about 10 μm to about 750 μm.

Q. The electrochromic device of any one of Paragraphs G-P, wherein the first resistive layer has a resistance of about 1,000 Ω/square to about 10,000 Ω/square, and the second resistive layer has a resistance of about 1,000 Ω/square to about 10,000 Ω/square.

R. The electrochromic device of any one of Paragraphs G-Q, wherein the first substrate comprises a glass material or a polymer material.

S. The electrochromic device of any one of Paragraphs G-R, wherein the second substrate comprises a glass material or a polymer material.

T. The electrochromic device of any one of Paragraphs G-S, wherein the electrochromic device is a window or mirror.

U. A method of producing an electrode for an electrochromic device, comprising:
  disposing a conductive layer over a substrate; and
  disposing a resistive layer over the conductive layer,
  wherein the substrate, conductive layer, and the resistive layer are substantially transparent.

V. The method of Paragraph U, wherein the conductive layer comprises indium tin oxide.

W. The method of Paragraph U or Paragraph V, wherein the resistive layer comprises oxidized titanium disilicide.

X. The method of any one of Paragraphs U-W, wherein the substrate comprises a glass material or a polymer material.

Y. The method of any one of Paragraphs U-X, further comprising disposing an additional conductive layer over the resistive layer, wherein the additional conductive layer is substantially transparent.

Z. The method of Paragraph Y, wherein the additional conductive layer comprises indium tin oxide.

AA. The method of any one of Paragraphs U-Z, further comprising:
disposing a sacrificial material over a portion of the conductive layer before disposing the resistive layer over the conductive layer; and
removing the sacrificial material after the deposition of the resistive layer.

AB. The method of Paragraph AA, wherein removing the sacrificial material comprises a laser ablation process.

AC. The method of Paragraph AA or Paragraph AB, wherein sacrificial material comprises chromium.

AD. The method of any one of Paragraphs U-AC, wherein disposing the resistive layer comprises a sputtering deposition process or a wet chemical applied coating.

AE. The method of any one of Paragraphs U-AD, wherein disposing the conductive layer comprises a chemical vapor deposition or physical vapor deposition process.

Other embodiments are set forth in the following claims.

What is claimed is:

1. An electrode assembly for an electrochromic device, comprising:
a substrate;
a conductive layer disposed over the substrate; and
a resistive layer disposed over the conductive layer,
wherein the substrate, the conductive layer, and the resistive layer is substantially transparent, and
wherein the resistive layer has a resistance of about 1,000 $\Omega$/square to about 10,000 $\Omega$/square.

2. The electrode assembly of claim 1, further comprising an additional conductive layer disposed over the resistive layer, wherein the additional conductive layer is substantially transparent.

3. The electrode assembly of claim 1, wherein the conductive layer comprises indium tin oxide.

4. The electrode assembly of claim 1, wherein the resistive layer comprises oxidized titanium disilicide.

5. The electrode assembly of claim 1, wherein the substrate comprises a glass material or a polymer material.

6. An electrochromic device, comprising:
a first substrate;
a first conductive layer disposed over the first substrate;
a first resistive layer disposed over the first conductive layer;
an electrochromic material;
a second substrate;
a second conductive layer disposed over the second substrate; and
a second resistive layer disposed over the second conductive layer,
wherein the first resistive layer is disposed between the first conductive layer and the electrochromic material, and the second resistive layer is disposed between the second conductive layer and the electrochromic material.

7. The electrochromic device of claim 6, further comprising at least one seal configured to prevent the electrochromic material from leaking out of the electrochromic device and/or configured to prevent atmospheric exposure of the electrochromic material.

8. The electrochromic device of claim 6, further comprising a first additional conductive layer disposed between the first resistive layer and the electrochromic material, and a second additional conductive layer disposed between the second resistive layer and the electrochromic material.

9. The electrochromic device of claim 6, wherein the first resistive layer has a resistance of about 1,000 $\Omega$/square to about 10,000 $\Omega$/square, and the second resistive layer has a resistance of about 1,000 $\Omega$/square to about 10,000 $\Omega$/square.

10. A method of producing an electrode for an electrochromic device, comprising:
disposing a conductive layer over a substrate;
subsequent to disposing the conductive layer, disposing a sacrificial material over a portion of the conductive layer;
subsequent to disposing the sacrificial material, disposing a resistive layer over the conductive layer including the portion covered by the sacrificial material; and
removing the sacrificial material after the deposition of the resistive layer,
wherein the substrate, conductive layer, and the resistive layer are substantially transparent.

11. The method of claim 10, further comprising disposing an additional conductive layer over the resistive layer, wherein the additional conductive layer is substantially transparent.

12. The method of claim 10, wherein removing the sacrificial material comprises a laser ablation process.

13. The method of claim 11, wherein sacrificial material comprises chromium.

14. The method of claim 10, wherein disposing the resistive layer comprises a sputtering deposition process or a wet chemical applied coating.

15. The method of claim 10, wherein disposing the conductive layer comprises a chemical vapor deposition or physical vapor deposition process.

* * * * *